H. J. Hyams,
Rotary Meter.

Nº 62,634.    Patented Mar. 5, 1867.

Witnesses:    Inventor:

United States Patent Office

HYAM JACOB HYAMS, OF NEW YORK, N. Y.

Letters Patent No. 62,634, dated March 5, 1867.

---

IMPROVEMENT IN WATER-METERS.

---

The Schedule referred to in these Letters Patent and making part of the same.

---

TO ALL WHOM IT MAY CONCERN:

Be it known that I, HYAM JACOB HYAMS, of the city, county, and State of New York, have invented a certain new and useful Improvement on Water-Meters, of which the following is a full, clear, and exact description, reference being had to the accompanying drawing, forming part of this specification, and in which—

Figure 1:
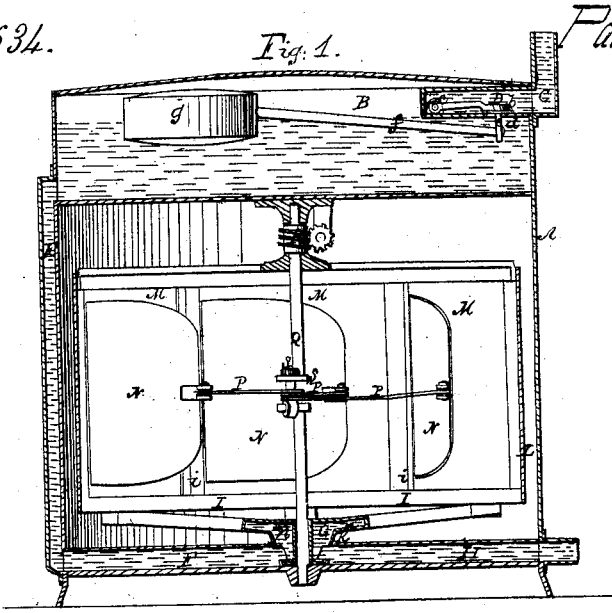

Figure 1 represents a vertical section of a water-meter constructed according to my improvement.

Figure 2:
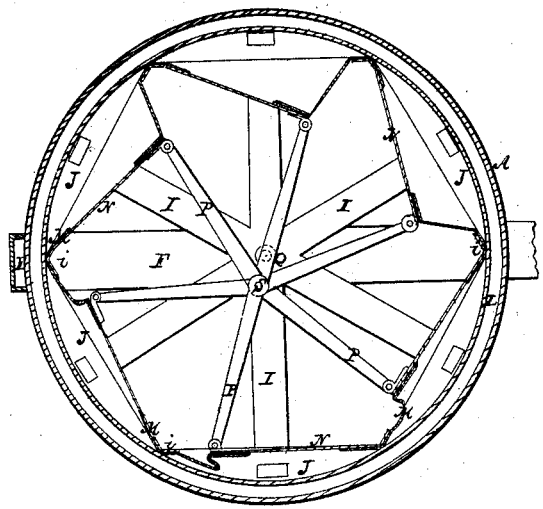
Figure 3:
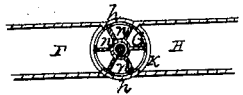

Figure 2, a horizontal section of the same through the diaphragm measuring chambers; and Figure 3, a horizontal section in part, illustrative of the valve arrangement for the supply and delivery of the water to and from the meter.

The nature of my invention consists, first, in a combination of flexible diaphragm chambers connected with a fixed crank and revolving frame in such manner as that the diaphragms, by their expansion and contraction are, with the frame which carries them, caused to revolve by the water passing through and out of them by a foot-valve controlling the inlet and outlet passages thereto, and by such motion made to register the amount of water or other liquid passing through the meter. And the nature of my invention further consists in the combination, with a water-meter, of a cistern and float-valve, to control or regulate the head of water flowing through the meter to given or fixed pressure, whereby the register is made to correctly record the quantity of water consumed. And said invention further consists in a general combination and arrangement of these devices in a water-meter to secure the more perfect action of the same.

Referring to the accompanying drawing, A represents the outer shell or case of the meter. B is a cistern, into which the water is admitted through a branch pipe, C, into a valve-chamber, D. This valve-chamber has arranged within it a lever-valve, $b$, hinged at $c$, and controlling a delivery aperture, $d$. Said valve is rigidly connected by a rod, $e$, with an arm, $f$, which has attached to its end farthest distant from the valve a float, $g$, the whole forming a bent-lever arrangement to the valve for controlling the head or pressure of water to the meter by the float $g$ rising and closing the valve when the supply is excessive, or falling and opening the valve to admit water when the supply diminishes, thus keeping up a uniform head or pressure to the meter, irrespective of the head or pressure in the main. E is the pipe or passage which conveys the water from the cistern by a lower horizontal passage, F, to the foot-valve G, which controls the admission and discharge to and from the measuring chambers; and H is the discharge pipe or outlet to the meter. The valve G, which is preferably of conical form, so as to keep it tight in its seat by the superincumbent pressure of water, is divided into six, more or less, compartments $n$, corresponding to the number of measuring chambers; said compartments being connected by hollow arms I with the measuring chambers J and the valve-seat K, in which the valve works, being open on opposite sides to the inlet F and discharge pipe H, division or partition plates $h$ being arranged on opposite sides at right angles to said pipes. L is the revolving cylinder, containing the measuring chambers J, with their inlet and outlet arms I and valve G. These measuring chambers, J, are constructed externally with flexible diaphragms M, backed by plates N, and secured at their back edges by plates $i$, which permit their free play in the manner of a hinge or door. Q is a central stationary shaft, on or round which the cylinder L, with its measuring chambers and attachments, revolves by the connection of the diaphragm plates N, through rods P, with a fixed crank, $s$, on said shaft, the measuring chambers, as they receive water from the inlet passage F, and discharge through the outlet passage H by means of the valve G, causing the diaphragms to expand and contract, and by the rotation of the cylinder L, carrying with it the worm R, revolving on the fixed shaft Q, communicate motion to any suitable register for the purpose of recording the amount of water passed through the meter, which, of course, is governed by the capacity of the measuring chambers J, receiving and discharging from and into the passages F H. The throw of the fixed crank, upon which, through the diaphragms, will depend the capacity of the measuring chambers, may be regulated by making the crank a slotted one, and connecting the rods P therewith by set-screws $s$. It will be observed that, as two or more measuring chambers are, by the valve compartments $n$, always open to the inlet, and the like number in free communication with the outlet, a continuous rotary motion of the cylinder is kept up.

What I claim as my invention, and desire to secure by Letters Patent, is—

1. The combination, with a fixed crank, S, of the revolving diaphragm measuring chambers J, constructed and arranged for operation, in connection with a foot-valve G, substantially as and for the purpose specified.

2. The combination and arrangement, substantially as shown and described, of the revolving cylinder, with its flexible diaphragms, foot-valve, and cistern, provided with a valve controlling the head or pressure to the measuring chambers, as herein set forth.

H. J. HYAMS.

Witnesses:
A. LE CLERC,
J. W. COOMBS.